US012681551B2

(12) United States Patent (10) Patent No.: US 12,681,551 B2
Qu (45) Date of Patent: Jul. 14, 2026

(54) METHOD AND APPARATUS FOR EXECUTING COMPUTING TASK, AND STORAGE MEDIUM AND ELECTRONIC APPARATUS

(71) Applicant: ZTE Corporation, Shenzhen (CN)

(72) Inventor: Zhicheng Qu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 137 days.

(21) Appl. No.: 18/722,453

(22) PCT Filed: Dec. 21, 2022

(86) PCT No.: PCT/CN2022/140813
§ 371 (c)(1),
(2) Date: Jun. 20, 2024

(87) PCT Pub. No.: WO2023/116790
PCT Pub. Date: Jun. 29, 2023

(65) Prior Publication Data
US 2025/0076960 A1 Mar. 6, 2025

(30) Foreign Application Priority Data

Dec. 21, 2021 (CN) .......................... 202111576266.7

(51) Int. Cl.
*G06F 1/32* (2019.01)
*G06F 1/3228* (2019.01)
(52) U.S. Cl.
CPC .................................. *G06F 1/3228* (2013.01)
(58) Field of Classification Search
CPC .................................................. G06F 1/3228
See application file for complete search history.

(56) References Cited

U.S. PATENT DOCUMENTS

| | | | | |
|---|---|---|---|---|
| 2020/0112434 A1* | 4/2020 | Goodson | ............. | H02J 13/0004 |
| 2021/0240474 A1* | 8/2021 | Minehan | ............. | G06Q 20/389 |
| 2022/0237695 A1* | 7/2022 | Hwang | ............. | G06Q 20/3825 |

FOREIGN PATENT DOCUMENTS

| | | |
|---|---|---|
| CN | 108009823 A | 5/2018 |
| CN | 111506932 A | 8/2020 |

(Continued)

OTHER PUBLICATIONS

International Search Report for corresponding application PCT/CN2022/140813 filed Dec. 21, 2022; Mail date Mar. 14, 2023.

*Primary Examiner* — Stefan Stoynov
(74) *Attorney, Agent, or Firm* — CANTOR COLBURN LLP

(57) ABSTRACT

Provided is a method and apparatus for executing a computing task. The method comprises: a target computing power node claiming a target computing task by querying a smart contract in a distributed ledger network, where the target computing power node is a node which completes computing power registration in the distributed ledger network in advance, and the target computing task is published by a target computing task publisher in the distributed ledger network; the target computing power node executing the target computing task based on task information of the target computing task, so as to obtain a target computing result; and the target computing power node submitting the target computing result to the smart contract, so as to instruct the smart contract to initiate a process of verifying the target computing result and to execute allocation of a computing power token corresponding to a verification result.

18 Claims, 7 Drawing Sheets

(56)　　　　　　References Cited

FOREIGN PATENT DOCUMENTS

| CN | 112132447 | A | 12/2020 |
|----|-----------|---|---------|
| CN | 113157444 | A | 7/2021 |
| CN | 113434269 | A | 9/2021 |
| CN | 113504988 | A | 10/2021 |

* cited by examiner

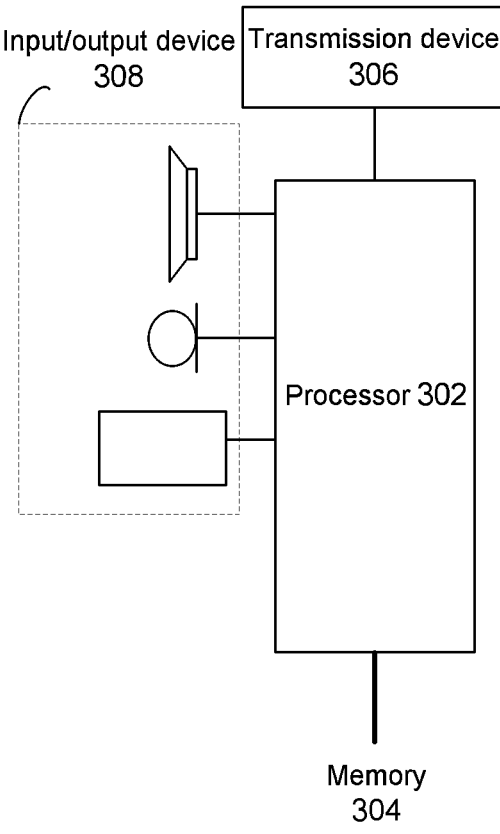

Input/output device 308

Transmission device 306

Processor 302

Memory 304

Fig. 3

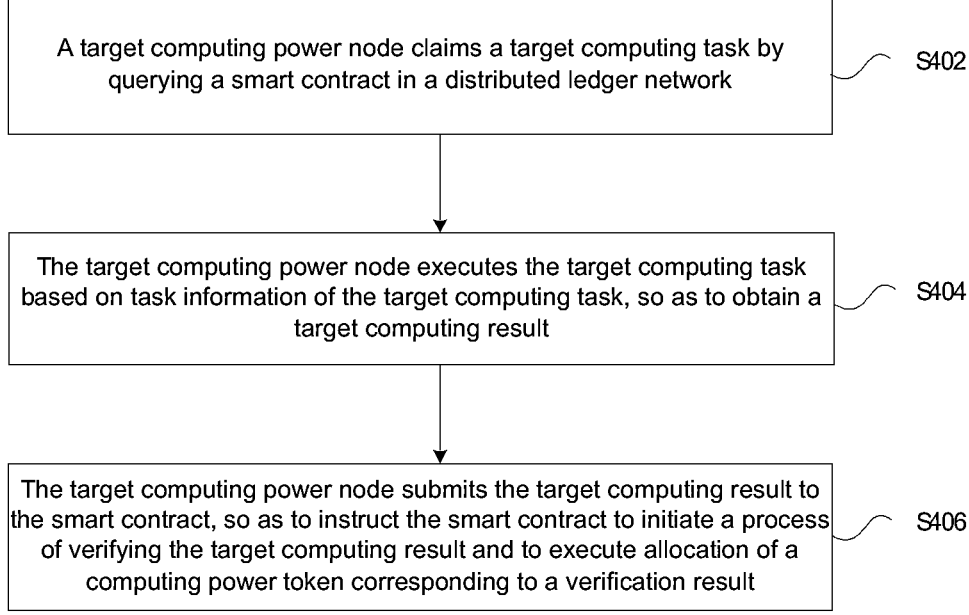

A target computing power node claims a target computing task by querying a smart contract in a distributed ledger network ⟋ S402

The target computing power node executes the target computing task based on task information of the target computing task, so as to obtain a target computing result ⟋ S404

The target computing power node submits the target computing result to the smart contract, so as to instruct the smart contract to initiate a process of verifying the target computing result and to execute allocation of a computing power token corresponding to a verification result ⟋ S406

Fig. 4

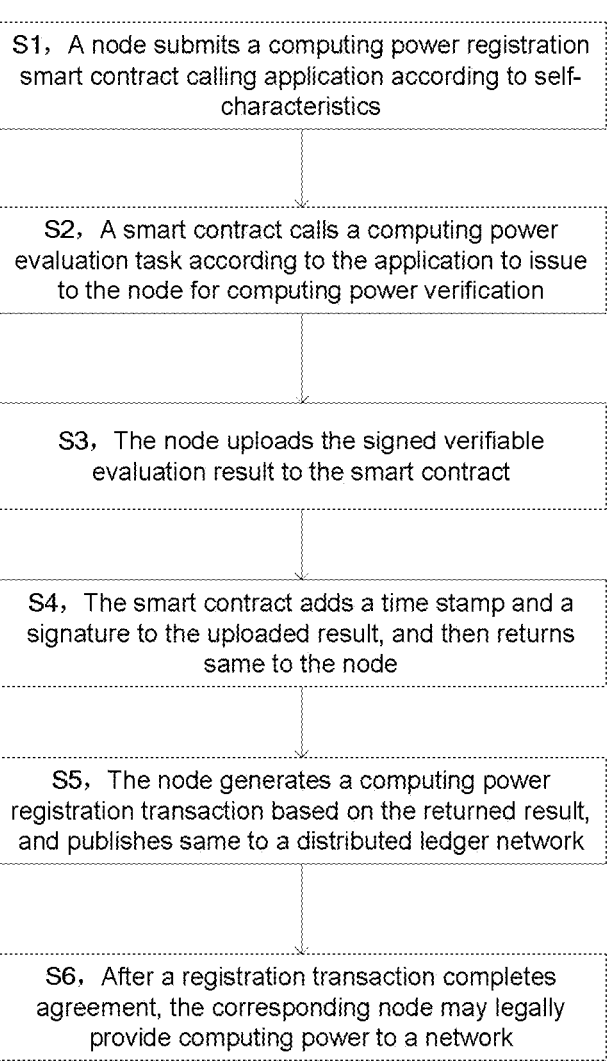

S1, A node submits a computing power registration smart contract calling application according to self-characteristics S2, A smart contract calls a computing power evaluation task according to the application to issue to the node for computing power verification S3, The node uploads the signed verifiable evaluation result to the smart contract S4, The smart contract adds a time stamp and a signature to the uploaded result, and then returns same to the node S5, The node generates a computing power registration transaction based on the returned result, and publishes same to a distributed ledger network S6, After a registration transaction completes agreement, the corresponding node may legally provide computing power to a network

Fig. 6

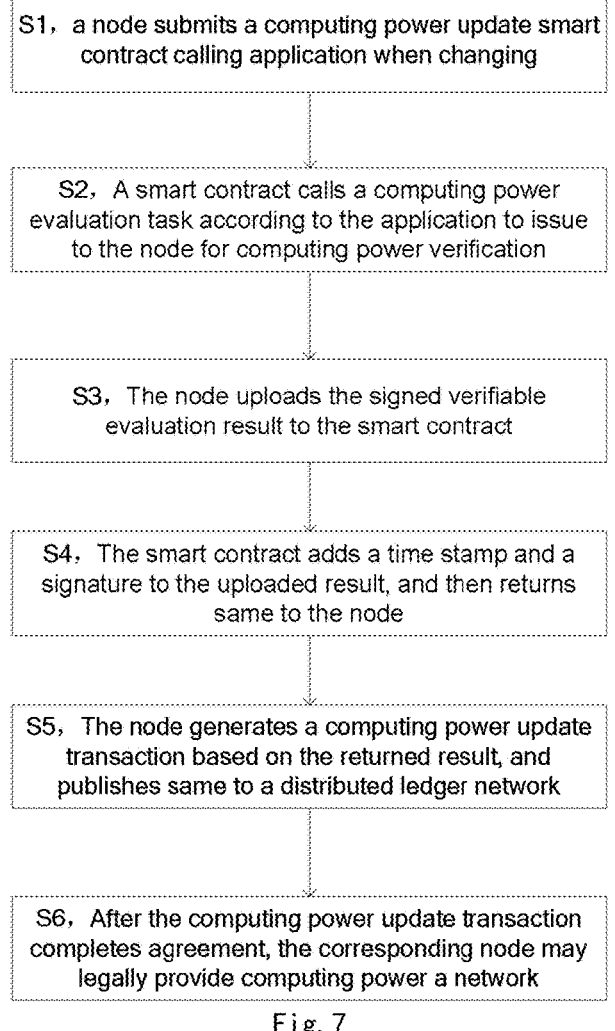

S1, a node submits a computing power update smart contract calling application when changing S2, A smart contract calls a computing power evaluation task according to the application to issue to the node for computing power verification S3, The node uploads the signed verifiable evaluation result to the smart contract S4, The smart contract adds a time stamp and a signature to the uploaded result, and then returns same to the node S5, The node generates a computing power update transaction based on the returned result, and publishes same to a distributed ledger network S6, After the computing power update transaction completes agreement, the corresponding node may legally provide computing power a network

Fig. 7

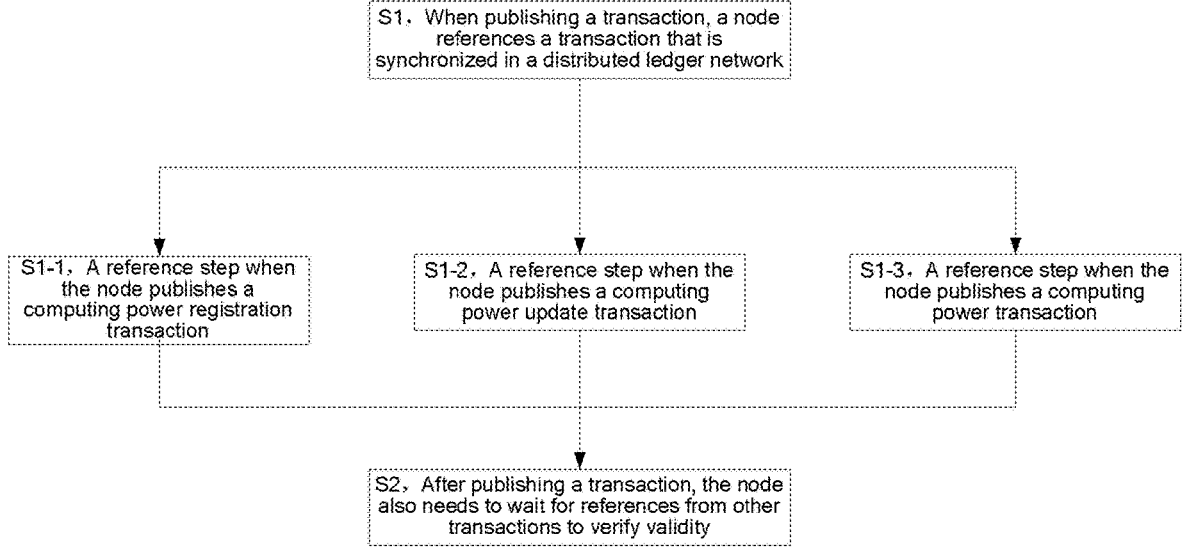

S1, When publishing a transaction, a node references a transaction that is synchronized in a distributed ledger network S1-1, A reference step when the node publishes a computing power registration transaction S1-2, A reference step when the node publishes a computing power update transaction S1-3, A reference step when the node publishes a computing power transaction S2, After publishing a transaction, the node also needs to wait for references from other transactions to verify validity

Fig. 8

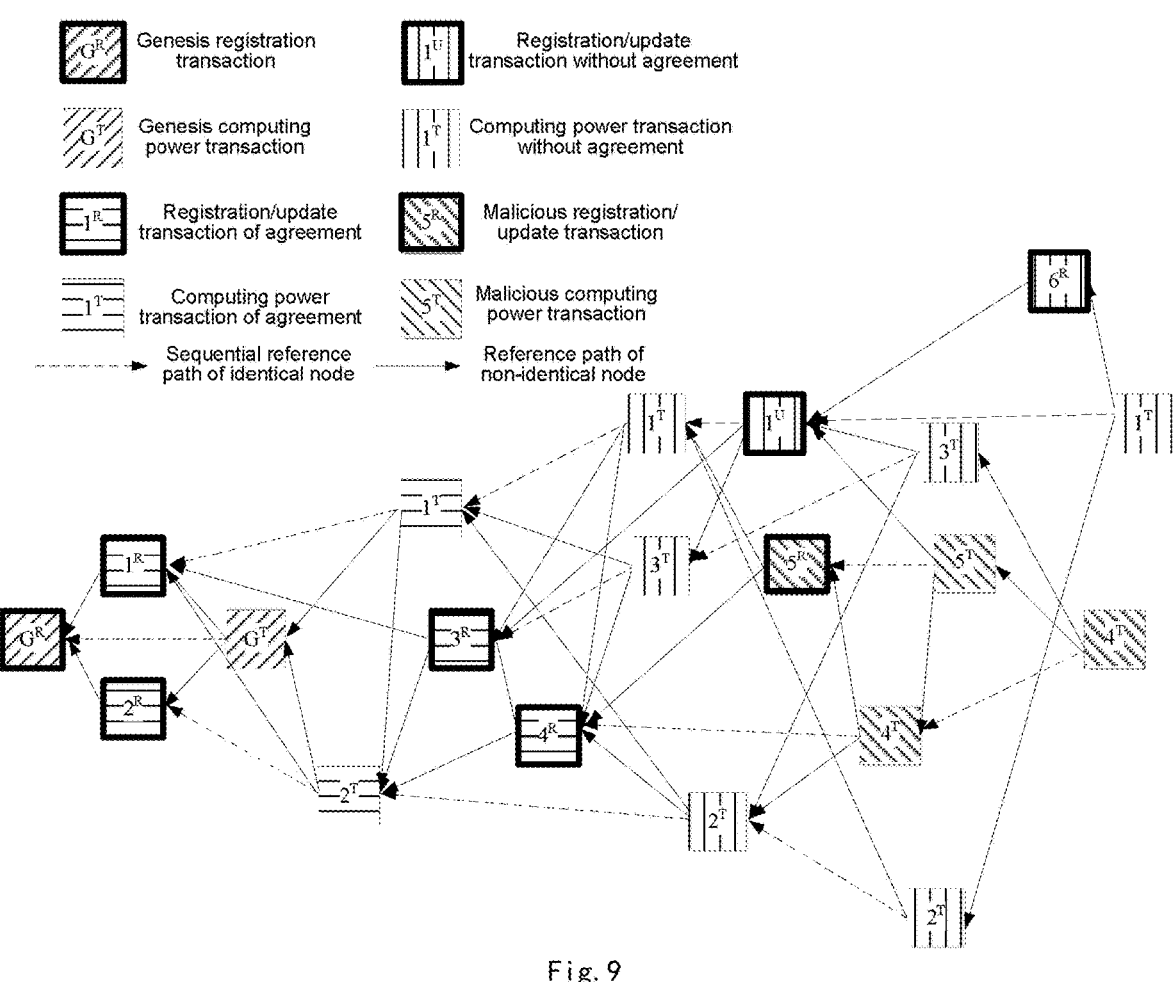

Fig. 9

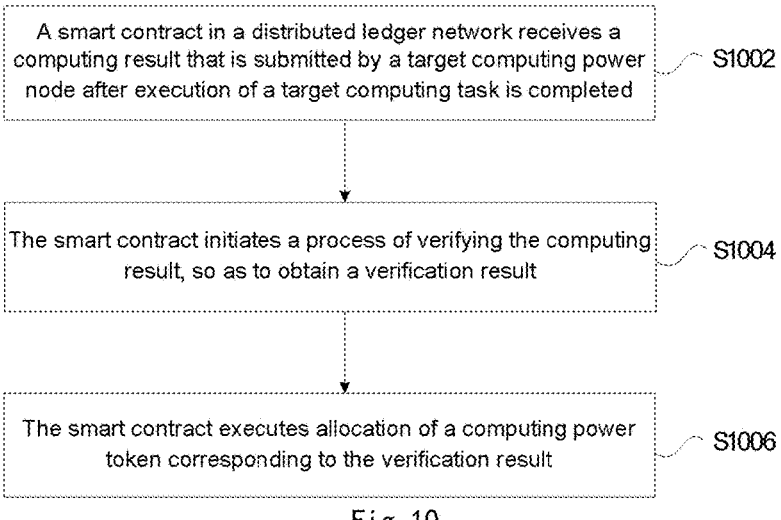

A smart contract in a distributed ledger network receives a computing result that is submitted by a target computing power node after execution of a target computing task is completed — S1002

The smart contract initiates a process of verifying the computing result, so as to obtain a verification result — S1004

The smart contract executes allocation of a computing power token corresponding to the verification result — S1006

Fig. 10

METHOD AND APPARATUS FOR EXECUTING COMPUTING TASK, AND STORAGE MEDIUM AND ELECTRONIC APPARATUS

CROSS-REFERENCE TO RELATED APPLICATION

The disclosure is a national stage filing under 35 U.S.C. § 371 of international application number PCT/CN2022/140813, filed Dec. 21, 2022, which claims the priority to Chinese Patent Application No. 202111576266.7, filed with the Chinese Patent Office on Dec. 21, 2021, which is incorporated in its entirety herein by reference.

TECHNICAL FIELD

Embodiments of the present disclosure relate to the field of communications, and specifically to a method and apparatus for executing a computing task, and a storage medium and an electronic apparatus.

BACKGROUND

At present, computing power demands for data processing are increasing rapidly. For massive, decentralized data processing scenarios, efficient computing power processing based only on internal data centers or terminals can no longer meet service requirements. Cloud resource deployment in data centers is gradually evolving from a traditional intensive central cloud mode to a collaborative scheduling mode between cloud computing and edge computing.

However, in the related art, in a cloud-edge collaborative scheduling frame, computing devices are wide in types and systems due to different types of computing tasks, and using a single fixed standard metric of computing power affects fairness and ubiquitous computing power resources cannot be effectively scheduled, resulting in low utilization efficiency of overall network resources to a certain extent.

SUMMARY

Embodiments of the present disclosure provide a method and apparatus for executing a computing task, and a storage medium and an electronic apparatus, so as to at least solve the problems in the related art of inability of realizing effective scheduling of ubiquitous computing power resources, thus resulting in low utilization efficiency of overall network resources to a certain extent.

An embodiment of the present disclosure provides a method for executing a computing task, including: a target computing power node claiming a target computing task by querying a smart contract in a distributed ledger network, where the target computing power node is a node which completes computing power registration in the distributed ledger network in advance, and the target computing task is published by a target computing task publisher in the distributed ledger network; the target computing power node executing the target computing task based on task information of the target computing task, so as to obtain a target computing result; and the target computing power node submitting the target computing result to the smart contract, so as to instruct the smart contract to initiate a process of verifying the target computing result and to execute allocation of a computing power token corresponding to a verification result.

Another embodiment of the present disclosure further provides a method for executing a computing task, including: a smart contract in a distributed ledger network receiving a computing result that is submitted by a target computing power node after execution of a target computing task is completed, where the target computing power node is a node which completes computing power registration in the distributed ledger network in advance, the target computing task is a task that is published by a target computing task publisher in the distributed ledger network by calling the smart contract, the target computing power node claims and executes the target computing task by querying the smart contract; the smart contract initiating a process of verifying the computing result, so as to obtain a verification result; and executing allocation of a computing power token corresponding to the verification result.

Another embodiment of the present disclosure provides an apparatus for executing a computing task. The apparatus is applied to a target computing power node and includes: a claiming module, configured to claim a target computing task by querying a smart contract in a distributed ledger network, where the target computing power node is a node which completes computing power registration in the distributed ledger network in advance, and the target computing task is published by a target computing task publisher in the distributed ledger network; an acquisition module, configured to execute the target computing task based on task information of the target computing task, so as to obtain a target computing result; and a submission module, configured to submit the target computing result to the smart contract, so as to instruct the smart contract to initiate a process of verifying the target computing result and to execute allocation of a computing power token corresponding to a verification result.

Another embodiment of the present disclosure further provides an apparatus for executing a computing task. The apparatus is applied to a smart contract in a distributed ledger network and includes: a receiving module, configured to receive a computing result that is submitted by a target computing power node after execution of a target computing task is completed, where the target computing power node is a node which completes computing power registration in the distributed ledger network in advance, the target computing task is a task that is published by a target computing task publisher in the distributed ledger network by calling the smart contract, the target computing power node claims and executes the target computing task by querying the smart contract; a verification module, configured to initiate a process of verifying the computing result, so as to obtain a verification result; and an execution module, configured to execute allocation of a computing power token corresponding to the verification result.

Still another embodiment of the present disclosure further provides a computer-readable storage medium. The computer-readable storage medium stores a computer program. Steps in any one of the above method embodiments are executed when the computer program is configured to operate.

Still another embodiment of the present disclosure further provides an electronic apparatus. The electronic apparatus includes a memory and a processor. The memory stores a computer program. The processor is configured to operate the computer program to execute steps in any one of the above method embodiments.

By means of the present disclosure, a distributed ledger technology is introduced in the deployment of a computing power network, and after a computing power node registers self-capability in the distributed ledger network, a trusted computing power set may be formed by using the tampering resistant and traceable characteristics of a distributed ledger, such that the computing power node may claim and execute a computing task when determining that there is a task that can be processed by itself, thereby making any computing node have a chance to participate the computing tasks. Therefore, it may be learned that, through a smart contract technology, an automatic computing power resource scheduling mode may be provided, thereby improving the utilization efficiency of overall network resources, thus effectively solving the problems in the related art of inability of realizing effective scheduling of ubiquitous computing power resources, thus resulting in low utilization efficiency of overall network resources to a certain extent.

BRIEF DESCRIPTION OF THE DRAWINGS

FIG. 3 is a block diagram of a hardware structure of a mobile terminal of a method for executing a computing task according to embodiments of the present disclosure.

FIG. 4 is a flowchart I of a method for executing a computing task according to embodiments of the present disclosure.

FIG. 6 is a flowchart of a node computing power registration method according to specific embodiments of the present disclosure.

FIG. 7 is a flowchart of a node computing power update method according to specific embodiments of the present disclosure.

FIG. 8 is a flowchart of a transaction recording method according to specific embodiments of the present disclosure.

FIG. 9 is a schematic diagram of a mutual reference relationship between transaction records in a distributed ledger network according to specific embodiments of the present disclosure.

FIG. 10 is a flowchart II of a method for executing a computing task according to embodiments of the present disclosure.

DETAILED DESCRIPTION OF THE EMBODIMENTS

The embodiments of the present disclosure are described below in detail with reference to the drawings and the embodiments.

It is to be noted that terms "first", "second" and the like in the description, claims and the above mentioned drawings of the present disclosure are used for distinguishing similar objects rather than describing a specific sequence or a precedence order.

Figure 1:
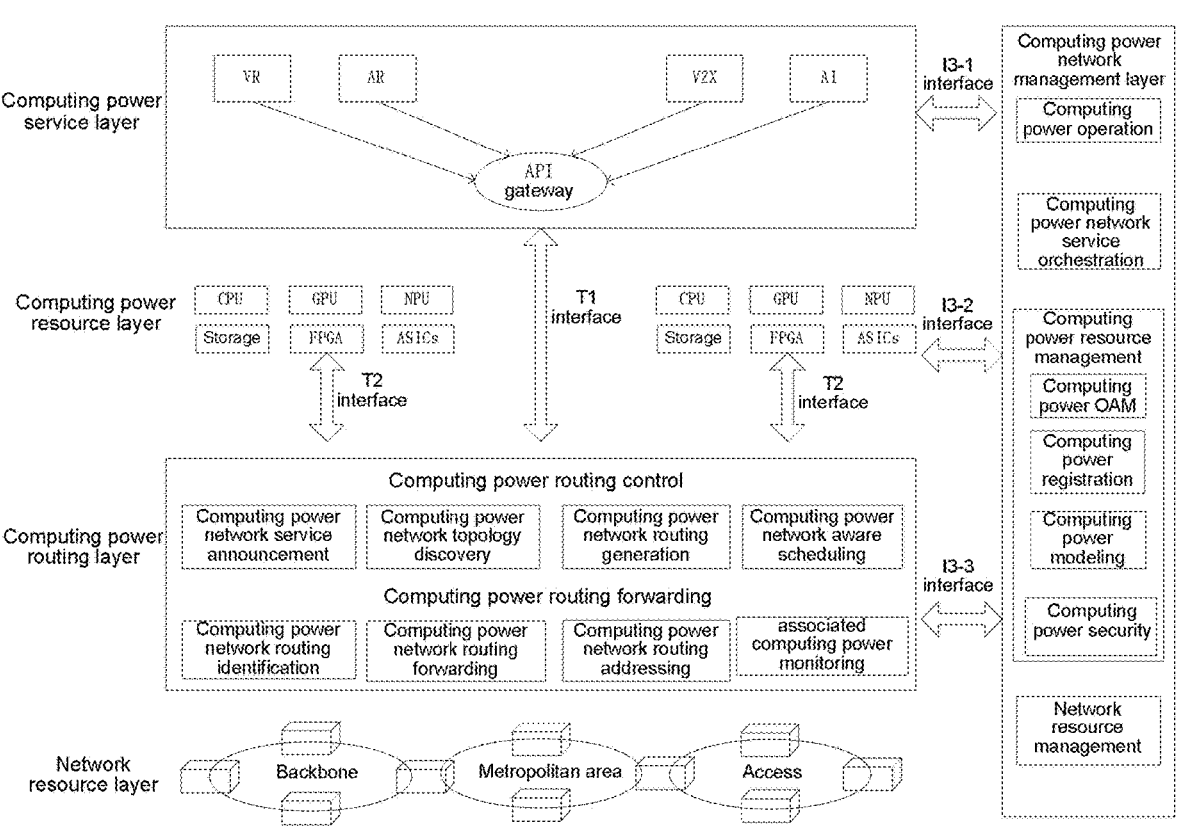
FIG. 1 is a schematic diagram of a computing power network architecture in the related art.

At present, computing power demands for data processing are increasing rapidly. For massive, decentralized data processing scenarios, efficient computing power processing based only on internal data centers or terminals can no longer meet service requirements. Cloud resource deployment in data centers is gradually evolving from a traditional intensive central cloud mode to a collaborative scheduling mode between cloud computing and edge computing. In a computing power network architecture shown in FIG. 1, in order to realize aware, interconnection, and collaborative scheduling of computing power and networks, the computing power network architecture is logically and functionally divided into five function modules of a computing power service layer, a computing power routing layer, a computing power network management layer, a computing power resource layer, and a network resource layer.

However, in a cloud-edge collaborative scheduling frame in the related art, computing devices are wide in types and systems due to different types of computing tasks, and using a single fixed standard metric of computing power affects fairness; furthermore, in a cloud-edge distributed computing power frame, any computing node has a chance to participate in a computing task, however, a centralized management frame in the related art is difficult to meet requirements of future scenarios.

In view of the above problem, in the present disclosure, introduction of a distributed ledger technology in the deployment of a computing power network is taken into consideration. A computing power node registers self-capability in the distributed ledger network, a trusted computing power set is formed by using the tampering resistant and traceable characteristics of a distributed ledger. Meanwhile, through a smart contract technology, an automatic computing power resource scheduling mode is provided, thereby improving the utilization efficiency of overall network resources.

Figure 2:
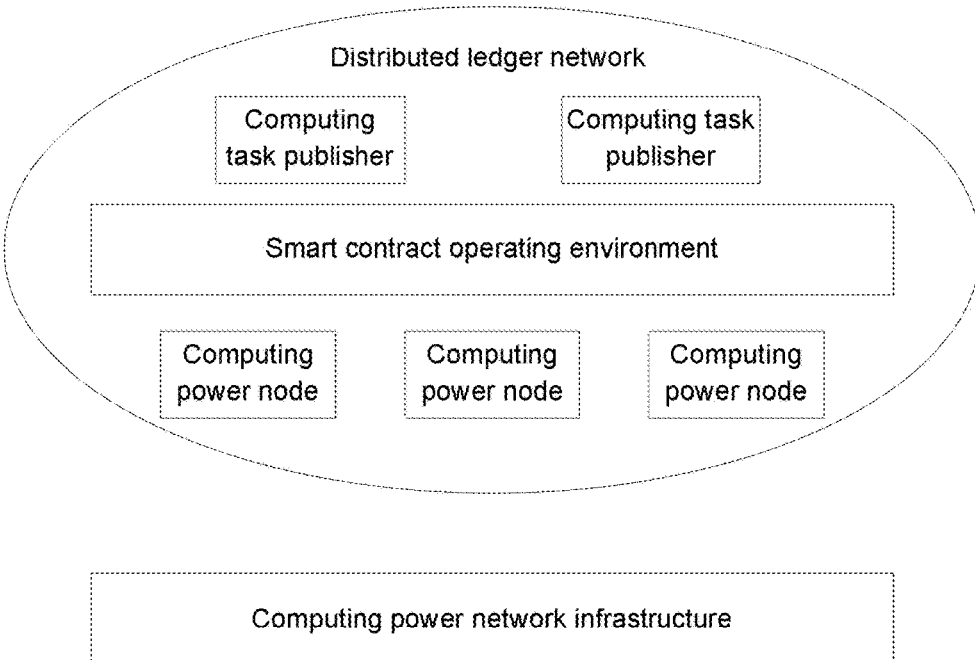
FIG. 2 is a schematic diagram of a computing power network combining a distributed ledger technology according to embodiments of the present disclosure.

Based on the above inventive concept, embodiments of the present disclosure provide a network computing power registration, update, and transaction methods based on a distributed ledger, which are applied to a computing power network shown in FIG. 2. The computing power network includes a computing power node (which may be called a node for short), the distributed ledger network, a smart contract operating environment based on the distributed ledger, a computing task publisher, and other infrastructures constituting the computing power network. The smart contract operating environment is similar to an environment similar of a virtual machine or a sandbox, and a main feature of the environment is that it is not subject to external influences, and can automatically operate a smart contract deployed therein. The smart contract is similar to a computer code that is automatically executed, which may obtain a corresponding output according to an input and be not subjected to external disturbance in an operating environment, thereby guaranteeing the authenticity of an output result. A plurality of smart contracts may be deployed in the smart contract operating environment, and need to be agreed upon by all parties involved before they are deemed valid.

The present disclosure is described below with reference to embodiments.

The method embodiments provided in the embodiments of the present disclosure may be executed in a mobile terminal, a computer terminal or a similar computing apparatus. By being operated on the mobile terminal as an example, FIG. 3 is a block diagram of a hardware structure of a mobile terminal of a method for executing a computing task according to embodiments of the present disclosure. As shown in FIG. 3, the mobile terminal may include one or more (only one is shown in FIG. 3) processors 302 (the processor 302 may include, but is not limited to, a processing apparatus such as a Microcontroller Unit (MCU) or a Field Programmable Gate Array (FPGA)) and a memory 304 configured to store data. The above mobile terminal may further include a transmission device 306 configured to achieve a communication function, and an input/output device 308. Those skilled in the art may understand that the structure shown in FIG. 3 is only a schematic diagram, which does not limit the structure of the above mobile terminal. For example, the mobile terminal may also include more or less components than those shown in FIG. 3, or have a different configuration from that shown in FIG. 3.

The memory 304 may be configured to store a computer program, for example, a software program and a module of application software, such as a computer program corresponding to a method for executing a computing task in the embodiments of the present disclosure. The processor 302 runs the computer program stored in the memory 304, so as to execute various functional applications and data processing, i.e., to realize the above method. The memory 304 may include a high-speed random access memory, and may further include a non-volatile memory, such as one or more magnetic disk memory apparatuses, a flash memory device, or other non-volatile solid-state memory devices. In some embodiments, the memory 304 may further include memories remotely disposed relative to the processor 302. The remote memories may be connected to the mobile terminal by using a network. Examples of the above network include, but are not limited to, the Internet, an intranet, a local area network, a mobile communication network, and a combination thereof.

The transmission apparatus 306 is configured to receive or send data via the network. The specific example of the above network may include a wireless network provided by a communication provider of the mobile terminal. In an example, the transmission apparatus 306 includes a Network Interface Controller (NIC), and may be connected to other network devices by using a base station, so as to communicate with the Internet. In an example, the transmission apparatus 306 is a Radio Frequency (RF) module, which is configured to communicate with the Internet in a wireless manner.

FIG. 4 is a flowchart I of a method for executing a computing task according to embodiments of the present disclosure. As shown in FIG. 4, the flow includes the following steps.

At S402, a target computing power node claims a target computing task by querying a smart contract in a distributed ledger network, where the target computing power node is a node which completes computing power registration in the distributed ledger network in advance, and the target computing task is published by a target computing task publisher in the distributed ledger network.

At S404, the target computing power node executes the target computing task based on task information of the target computing task, so as to obtain a target computing result.

At S406, the target computing power node submits the target computing result to the smart contract, so as to instruct the smart contract to initiate a process of verifying the target computing result and to execute allocation of a computing power token corresponding to a verification result.

The above operations may be executed by a computing power node, or by other modules or devices having capabilities similar to that of the computing power node.

In the above embodiments, computing power capabilities supported by different computing power nodes may be different; and the target computing power node may query the smart contract according to a predetermined query cycle, and claim and execute the corresponding computing task when querying the target computing task that can be processed by itself. In the embodiments of the present disclosure, the computing task may be published by a task publisher through the smart contract. The published computing task may include information related to task execution such as initial configuration of the computing task, estimated consumption of computing resources, task priority, task time limits, timeout penalty, etc. The estimated consumption of computing resources, the task priority, and the task time limits are related to final remuneration of the computing task.

By means of the above embodiments, a distributed ledger technology is introduced in the deployment of a computing power network, and after a computing power node registers self-capability in the distributed ledger network, a trusted computing power set may be formed by using the tampering resistant and traceable characteristics of a distributed ledger, such that the computing power node may claim and execute a computing task when determining that there is a computing task that can be processed by itself, thereby making any computing node have a chance to participate the computing tasks. Therefore, it may be learned that, through a smart contract technology, an automatic computing power resource scheduling mode may be provided, thereby improving the utilization efficiency of overall network resources, thus effectively solving the problems in the related art of inability of realizing effective scheduling of ubiquitous computing power resources, thus resulting in low utilization efficiency of overall network resources to a certain extent.

In an exemplary embodiment, after the target computing power node submits the target computing result to the smart contract, the method further includes: the target computing power node acquiring first signature information from the smart contract, where the first signature information is information that is generated after the target computing power node verifies and signs the target computing result; and the target computing power node signing the first signature information, then generating a target computing power transaction, and publishing same to the distributed ledger network.

In an exemplary embodiment, after the target computing power node generates the target computing power transaction, and publishes same to the distributed ledger network, the method further includes: receiving a computing power token provided by the smart contract according to a target rule.

The above several embodiments are mainly to describe computing power transactions, and the node computing power transaction method is fully described below with reference to specific embodiments.

Figure 5:
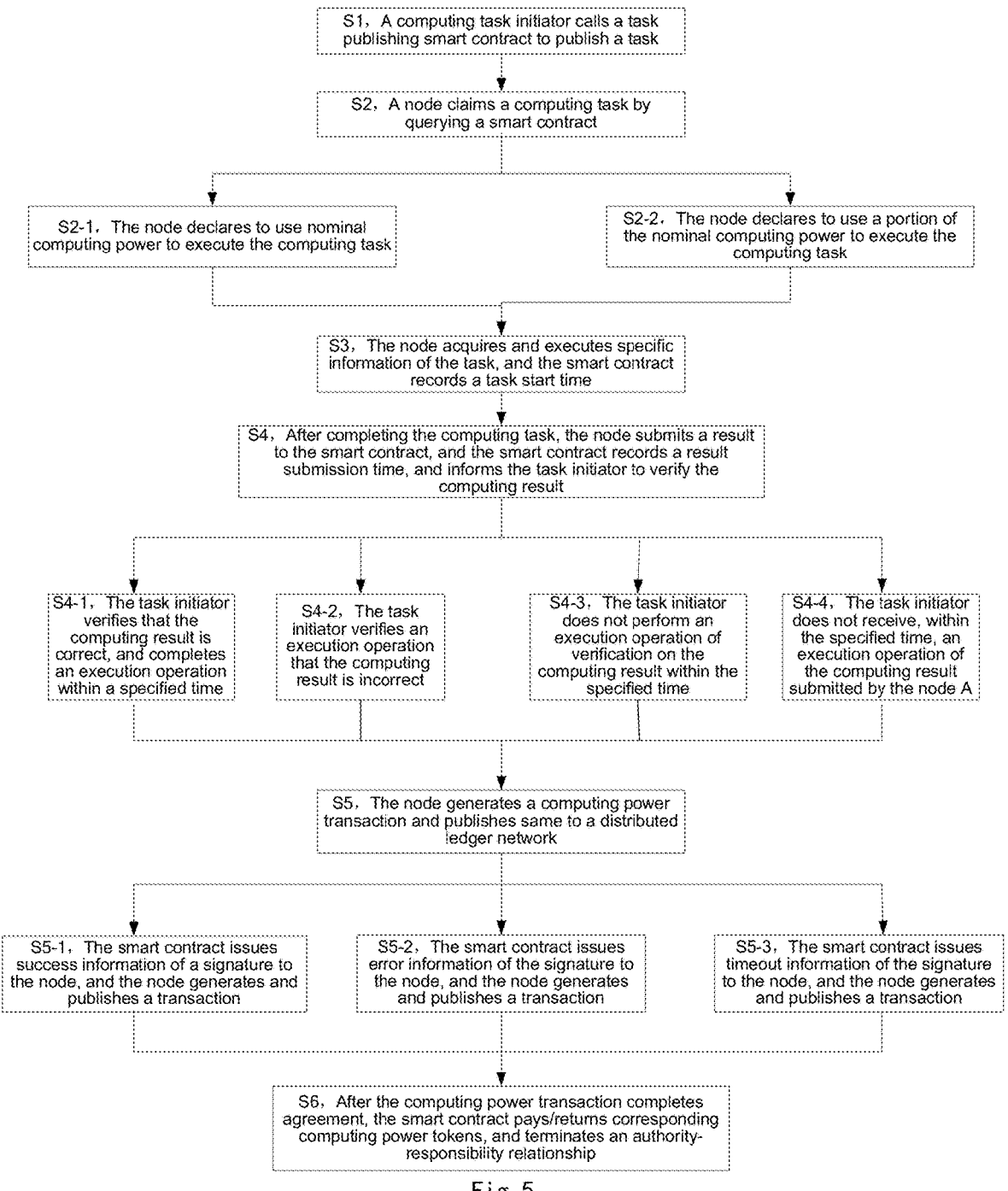
FIG. 5 is a flowchart of a node computing power transaction method according to specific embodiments of the present disclosure.

FIG. 5 is a flowchart of a node computing power transaction method according to specific embodiments of the present disclosure. As shown in FIG. 5, the method includes the following steps.

At S1, a computing task initiator calls a task publishing smart contract from the smart contract operating environment to publish the computing task.

The computing task published by the smart contract includes, but is not limited to, information related to computing task execution such as initial configuration of the computing task, estimated consumption of computing resources, task priority, task time limits, timeout penalty, etc. The estimated consumption of computing resources, the task priority, and the task time limits are related to final remuneration of the computing task.

In addition, when publishing the computing task by the smart contract, the computing task initiator also needs to freeze a matching computing power token in the smart contract in advance according to estimation of the information of the computing task. Meanwhile, if there is only a single node participating in the computing task, at least one contrast party needs to be set.

It is to be noted that, the computing power token mentioned here is linked to reference computing power, and is only used for a settlement after a computing power transaction, avoiding denial by the computing task initiator.

At S2, a node claims the computing task by querying the smart contract.

After the computing task is published, any legal computing power node (hereinafter referred to as a legal node or node) in a network may understand summary information of the computing task through the smart contract, including task types, priorities, estimated resource consumption, task time limits, timeout penalty, etc. The node selects or refuses to claim the computing task according to a personal situation. The legal node refers to a node that has successfully completed an effective computing power registration/update transaction in the network.

After confirming to claim one computing task, one legal node A needs to freeze, to the smart contract, a computing power token that is claimed by task timeout penalty, so as to prevent a malicious node from obstructing task completion. In addition, the method may further specifically include steps 2-1 and 2-2.

At S2-1, when a node A declares to use nominal computing power to execute the computing task, identity information (including, but not limited to, a series of information that may uniquely identify the node, such as a node identity, a physical address, an IP address, etc.) of the node is locked with the computing task during a task duration. When the node A attempts to claim other computing tasks during the task duration, the smart contract refuses the claim request according to the locked identity information.

At S2-2, when the node A declares to use a portion of the nominal computing power to execute the computing task, declaration computing power of the node is locked during the task duration. When the node A attempts to claim other computing tasks during the task duration, and if the node declares that the used computing power exceeds unlocked computing power, the smart contract refuses the claim request according to a determination principle.

At S3, the node A acquires specific information of the computing task through the smart contract and executes the computing task, and the smart contract records a task start time.

At S4, after completing the computing task, the node A submits a computing result to the smart contract. After receiving the computing result, the smart contract records a result submission time, and informs the task initiator to verify the computing result. The task initiator provides a computing result verification method to the smart contract. During verification, the task initiator may submit one smart contract for verifying the computing result, and the smart contract operating environment executes the contract to verify the computing result. The purpose is to ensure that a participant of the computing task is unable to obtain read data before completion of a task transaction, thereby protecting the interests of both parties. A specific verification mode varies with the computing tasks, and may be flexibly set based on a specific computing task. It is to be noted that, the computing result is saved in the smart contract in the form of privacy data, such that the task initiator is unable to obtain complete data before completion of verification. In addition, the method may further specifically include steps 4-1, 4-2, and 4-3.

At S4-1, the task initiator verifies, within a specified time, that the computing result is correct, informs the smart contract to pay a specific number of computing power tokens to the node A, and informs the smart contract to pre-thaw the computing power token frozen by the node A. Signature confirmation information of task completion is provided to the smart contract at the same time, and after the smart contract verifies a signature, a complete computing result is provided to the task initiator.

It is to be noted that, in S4-1, if a plurality of parties participate in the same computing task and the amount of each sub-task is equal, and if there is a significant difference among computing power (declaration computing power x task time) actually consumed by the node, the smart contract needs to be informed to temporarily deduct the corresponding computing power token from the timeout penalty frozen by the node that actually consumes more computing power than expected, so as to prevent the node from falsely declaring the computing power to get bigger payoffs.

At S4-2, the task initiator verifies that the computing result is incorrect, then submits an error authentication result of the signature to the smart contract, informs the smart contract to abandon the result, and informs the smart contract to temporarily deduct the corresponding computing power token from the timeout penalties frozen by the node A, and if a task failure penalty is less than the computing power token frozen by the node A, an exceeding portion is returned to the node A after an agreed unlocking period.

At S4-3, if the task initiator does not verify the computing result within the specified time, the smart contract pre-pays, to the node A, a computing power token corresponding to the computing power consumed by the node A from computing power tokens frozen by the task initiator, and abandons the computing result. If there are remaining computing power tokens after completion of pre-payment, the remaining computing power tokens are returned to the task initiator after the agreed unlocking period.

At S4-4, if the task initiator does not receive the computing result submitted by the node A within the specified time, the smart contract deducts the computing power tokens frozen by the node A after timeout.

At S5, the node A generates a computing power transaction and publishes same to the distributed ledger network. In addition, the method may further specifically include steps 5-1, 5-2, and 5-3.

At S5-1, corresponding to S4-1, i.e., when the computing task is successfully completed, the smart contract issues task information (including, but not limited to, confirmation information of a task initiator signature, task starting and ending time stamps, task remuneration, task timeout penalties, etc.) of the signature to the node A, and after signing the task information, the node A generates the computing power transaction and publishes same to the distributed ledger network.

At S5-2, corresponding to S4-2, i.e., a situation where the computing task fails due to an error in the node A. In this case, the smart contract issues the task information (including, but not limited to, the confirmation information of the task initiator signature, the task starting and ending time stamps, and task failure penalties) of the signature to the node A, and after signing the task information, the node A generates the computing power transaction and publishes same to the distributed ledger network.

At S5-3, corresponding to S4-3, i.e., a situation where the task initiator does not verify the computing result within the specified time. In this case, the smart contract issues the task information (including, but not limited to, the task starting and ending time stamps and specified verification time) of the signature to the node A, and after signing the task information, the node A generates the computing power transaction and publishes same to the distributed ledger network.

At S6, after the computing power transaction published to the distributed ledger network completes agreement, the smart contract pays/returns the corresponding computing power tokens to task participants according to rules, thaws all frozen computing power tokens bound to the smart contract, and then terminates an authority-responsibility relationship among the task participants.

In an exemplary embodiment, the method further includes: when publishing the target computing power transaction, the target computing power node referencing a first transaction that is synchronized in the distributed ledger network by the target computing power node.

In an exemplary embodiment, referencing the first transaction that is synchronized in the distributed ledger network by the target computing power node includes: referencing two other computing power transactions that are synchronized in the distributed ledger network by the target computing power node, and a latest computing power transaction that has been previously published by the target computing power node.

In the above embodiments, when publishing a transaction, a node references a transaction that is synchronized in the distributed ledger network. A next transaction includes summary information (which may be a hash value or other types of information) of a previous transaction, so as to guarantee the stability (as the cost of destabilization is high) of a reference relationship. The reference mode may use a transaction reference mode in a traditional blockchain.

In an exemplary embodiment, before the target computing power node claiming the target computing task by querying the smart contract in the distributed ledger network, the method further includes: the target computing power node executing computing power registration in the distributed ledger network.

In an exemplary embodiment, the target computing power node executing computing power registration in the distributed ledger network includes: the target computing power node sending a smart contract calling application to the smart contract based on a computing power capability of the target computing power node; the target computing power node receiving a computing power evaluation task returned by the smart contract based on the smart contract calling application; the target computing power node executing the computing power evaluation task, and signing an execution result after execution of the computing power evaluation task is completed, so as to obtain second signature information; the target computing power node sending the second signature information to the smart contract; and when receiving third signature information returned by the smart contract based on the second signature information, the target computing power node generating a computing power registration transaction based on the third signature information, and publishing same into the distributed ledger network. The third signature information is information that is obtained after the smart contract adds a time stamp and a signature to the second signature information.

In an exemplary embodiment, when the computing power registration transaction completes agreement, the target computing power node is allowed to provide computing power to a computing power network; the computing power network includes the distributed ledger network; nominal computing power of the target computing power node is a ratio of a computing power reference time to a difference value between evaluation completion and issuance time stamps in a registration transaction, the evaluation completion is used for indicating that evaluation of a first node parameter local to the target computing power node is completed, and a correct execution result of the computing power evaluation task is able to be obtained through the first node parameter after the evaluation completion.

The above several embodiments are to describe the registration mode of the computing power node, and a node computing power registration method is fully described below with reference to specific embodiments.

FIG. 6 is a flowchart of a node computing power registration method according to specific embodiments of the present disclosure. As shown in FIG. 6, the method includes the following steps.

At S1, a node submits a computing power registration smart contract calling application according to self-characteristics, where a smart contract has an Application Program Interface (API), and the API should be called in an operating environment.

At S2, a smart contract operating environment acquires, according to application content, an appropriate computing power evaluation task to issue to the node for computing power verification.

For example, if the node declares that it is registered for neural network related computing power, a computing power registration smart contract randomly draw part of samples from a preset neural network training set, so as to constitute a training set of computing power evaluation tasks, and issues a task training set marked with time stamps to the node for computing power verification.

The preset neural network training set is invisible to all nodes in advance to prevent the nodes from optimizing self-models in advance, resulting in unfairness. In addition, the training set of computing power evaluation tasks is generated by random drawing in a preset training set, so as to prevent training set leakage.

It is to be noted that, the neural network used herein as an example is only for the purpose of explaining the related method steps, and does not mean that the computing power and computing power evaluation tasks described in the embodiments of the present disclosure are limited to the neural network related computing power. In fact, the computing power described in the embodiments of the present disclosure includes, but is not limited to, the neural network related computing power, and other types of computing power may be executed with reference to operations of the neural network related computing power.

In addition, the method for generating the computing power evaluation task is consistent for all participating nodes, for example, an evaluation task training set is randomly generated from the preset training set. Computing power evaluation reference corresponds to the method, i.e., under a condition of using a reference time to complete evaluation, if an evaluation result generated meets a predetermined requirement, the time is called a computing power reference time, and corresponding computing power is reference computing power.

At S3, the node completes the computing power evaluation task, and then uploads the signed verifiable evaluation result to the smart contract.

At S4, the smart contract adds a time stamp and a signature to the uploaded result, and then returns same to the node.

At S5, the node generates a computing power registration transaction based on the obtained returned result, and publishes same to a distributed ledger network, where since the distributed ledger network needs global agreement to complete the transaction, the publishing described herein is actually to publish to all nodes participating the agreement in a network. The publishing operation specifically includes: a transaction initiator generating one transaction according to a transaction template, and transmitting same to all the nodes participating the agreement in the network in a certain manner. The computing power registration transaction includes: evaluation task results of node signatures, training issuing of smart contract signatures, completion time stamps, and transaction integrity protection information. The transaction integrity protection information is mainly to protect content of computing power transaction information, and commonly-used methods include hash check, etc.

At S6, after a registration transaction completes agreement, the corresponding node may legally provide computing power to the network, i.e., providing the computing power to a computing power network, where the computing power network includes the distributed ledger network, and nominal computing power of the node is a ratio of a computing power reference time to a difference value between training completion (the computing power here uses computing power serving a neural network as an example, training completion means that local model training is completed and can output a correct result, and a training completion is equal to a time for submitting an evaluation result) and issuance time stamps in a registration transaction.

In an exemplary embodiment, the method further includes: when publishing the computing power registration transaction, the target computing power node referencing a second transaction that is synchronized in the distributed ledger network by the target computing power node.

In an exemplary embodiment, referencing the second transaction that is synchronized in the distributed ledger network by the target computing power node includes: referencing one other computing power registration transaction and/or computing power update transaction that is allowed to be verified and synchronized in the distributed ledger network by the target computing power node, and one other computing power transaction that is allowed to be verified and synchronized in the distributed ledger network by the target computing power node.

In the above embodiments, when publishing a computing power registration transaction, the node references one computing power registration/update transaction of a same type that is synchronized in the distributed ledger network. In addition, one computing power transaction synchronized in the distributed ledger network also needs to be referenced.

The computing power of the target computing power node may also be updated, and in this case, the computing power of the target computing power node needs to be updated. An update operation is described below.

In an exemplary embodiment, the method further includes: the target computing power node updating registered computing power in the distributed ledger network.

In an exemplary embodiment, the target computing power node updating the registered computing power in the distributed ledger network includes: when determining that self-computing power capability has changed, the target computing power node sending a computing power update smart contract calling application to the smart contract; the target computing power node receiving an update computing power evaluation task returned by the smart contract based on the computing power update smart contract calling application; the target computing power node executing the update computing power evaluation task, and signing an execution result after execution of the update computing power evaluation task is completed, so as to obtain fourth signature information; the target computing power node sending the fourth signature information to the smart contract; and when receiving fifth signature information returned by the smart contract based on the fourth signature information, the target computing power node generating a computing power update transaction based on the fifth signature information, and publishing same into the distributed ledger network. The fifth signature information is information that is obtained after the smart contract adds a time stamp and a signature to the fourth signature information.

In an exemplary embodiment, when the computing power update transaction completes agreement, the target computing power node is allowed to provide updated computing power to a computing power network; the computing power network includes the distributed ledger network; updated nominal computing power of the target computing power node is a ratio of a computing power reference time to a difference value between evaluation completion and issuance time stamps in an update transaction, the evaluation completion is used for indicating that evaluation of a second node parameter local to the target computing power node is completed, and a correct execution result of the update computing power evaluation task is able to be obtained through the second node parameter after the evaluation completion.

The above several embodiments are to describe computing power updating of the computing power node, and a node computing power update method is fully described below with reference to specific embodiments.

FIG. 7 is a flowchart of a node computing power update method according to specific embodiments of the present disclosure. As shown in FIG. 7, the method includes the following steps.

At S1, a node submits a computing power update smart contract calling application when changing (including, but not limited to software/hardware modifications).

At S2, a smart contract operating environment acquires, according to application content, an appropriate computing power evaluation task to issue to the node for computing power verification.

At S3, the node completes the computing power evaluation task, and then uploads the signed verifiable evaluation result to the smart contract.

At S4, the smart contract adds a time stamp and a signature to the uploaded result, and then returns same to the node.

At S5, the node generates a computing power update transaction based on the returned result, and publishes same to a distributed ledger network.

The computing power update transaction includes: evaluation task results of node signatures, training issuing of smart contract signatures, completion time stamps, and transaction integrity protection information.

At S6, after an update transaction completes agreement, the corresponding node may legally provide computing power a network (i.e., a computing power network) again, and the updated nominal computing power of the node is a ratio of a computing power reference time to a difference value between training completion and issuance time stamps in an update transaction.

In an exemplary embodiment, the method further includes: when publishing the computing power update transaction, the target computing power node referencing a third transaction that is synchronized in the distributed ledger network by the target computing power node.

In an exemplary embodiment, referencing the third transaction that is synchronized in the distributed ledger network by the target computing power node includes: referencing one other computing power registration transaction and/or computing power update transaction that is allowed to be verified and synchronized in the distributed ledger network by the target computing power node, one other computing power transaction that is allowed to be verified and synchronized in the distributed ledger network by the target computing power node, and a latest transaction that is completed before the target computing power node updates the registered computing power.

A transaction recording method is fully described with reference to specific embodiments.

FIG. 8 is a flowchart of a transaction recording method according to specific embodiments of the present disclosure. As shown in FIG. 8, the method includes the following steps.

At S1, when publishing a transaction, a node references a transaction that is synchronized in a distributed ledger network. The definition of reference is to verify content of the transaction referenced, and the reference to the transaction depends on the self-weight of the transaction. In all transactions, registration/update transactions that are not referenced have a higher reference weight than ordinary computing power transactions. The reference weight decreases with the number of times the transaction referenced. The method may further specifically include steps 1-1, 1-2, and 1-3.

At S1-1, when publishing a computing power registration transaction, the node references one computing power registration/update transaction of a same type that is synchronized in the distributed ledger network. In addition, one computing power transaction synchronized in the distributed ledger network also needs to be referenced.

At S1-2, when publishing a computing power update transaction, in addition to referencing the two transactions in S1-1, the node also needs to reference its own latest transaction before the computing power is updated.

At S1-3, when publishing a computing power transaction, the node references two computing power transactions synchronized in the distributed ledger network, and furthermore, the node also needs to reference the latest transaction before the transaction.

At S2, after publishing a transaction, the node also needs to wait for references from other transactions to form agreement, so as to verify validity.

FIG. 9 is a schematic diagram of a mutual reference relationship between transaction records in a distributed ledger network. A GR transaction is a Genesis registration transaction record of an entire network, a GT transaction is a Genesis computing power transaction record of the entire network, and the GT transaction references an initial registration transaction record in the distributed ledger network. The computing power registration/update transaction and computing power transaction of the node are performed according to the foregoing transaction recording method.

Squares filled with horizontal lines in FIG. 9 represent transaction records that have obtained agreement, squares filled with vertical lines represent transaction records that have not achieve the agreement yet, and squares filled with slashes (i.e., lines drawn from top left to bottom right, corresponding to $5^R$, $5^T$, and $4^T$ in FIG. 9) represent potential malicious transaction records (it is to be noted that, the squares filled with the slashes only represent that current records in FIG. 9 are highly likely to be malicious records, as a transaction between two nodes is only referenced by each other; and if the records meet an agreement condition in the future, the records may be accepted by the network as well). In addition, it is to be noted that, the reference relationship between the transaction records shown in FIG. 9 is only a visual representation of the transaction recording method and does not represent a true state of the network.

FIG. 10 is a flowchart II of a method for executing a computing task according to embodiments of the present disclosure. As shown in FIG. 10, the flow includes the following steps.

At S1002, a smart contract in a distributed ledger network receives a computing result that is submitted by a target computing power node after execution of a target computing task is completed, where the target computing power node is a node which completes computing power registration in the distributed ledger network in advance, the target computing task is a task that is published by a target computing task publisher in the distributed ledger network by calling the smart contract, the target computing power node claims and executes the target computing task by querying the smart contract.

At S1004, the smart contract initiates a process of verifying the computing result, so as to obtain a verification result.

At S1006, the smart contract executes allocation of a computing power token corresponding to the verification result.

The above operations may be executed by the smart contract in the distributed ledger network, or by other modules or devices having capabilities similar to that of the smart contract in the distributed ledger network.

By means of the above embodiments, a distributed ledger technology is introduced in the deployment of a computing power network, and after a computing power node registers self-capability in the distributed ledger network, a trusted computing power set may be formed by using the tampering resistant and traceable characteristics of a distributed ledger, such that the computing power node may claim and execute a computing task when determining that there is a computing task that can be processed by itself, thereby making any computing node have a chance to participate the computing tasks. Therefore, it may be learned that, through a smart contract technology, an automatic computing power resource scheduling mode may be provided, thereby improving the utilization efficiency of overall network resources, thus effectively solving the problems in the related art of inability of realizing effective scheduling of ubiquitous computing power resources, thus resulting in low utilization efficiency of overall network resources to a certain extent.

In an exemplary embodiment, the smart contract initiating the process of verifying the computing result, so as to obtain the verification result includes: the smart contract saving the computing result in the form of privacy data; and the smart contract informing the task publisher to verify the computing result saved in the smart contract, so as to obtain the verification result.

In an exemplary embodiment, the smart contract inform-ing the task publisher to verify the computing result saved in the smart contract includes: the smart contract informing the task publisher to execute the following operation to verify the computing result: submitting, by the task publisher, a first smart contract for executing a verification operation, and operating the first smart contract in a smart contract operating environment in which the smart contract is located, so as to use the first smart contract to verify the computing result.

In an exemplary embodiment, before the smart contract receiving the computing result that is submitted by the target computing power node after execution of the target com-puting task is completed, the method further includes at least one of the following: when the target computing task pub-lisher publishes the target computing task, the smart contract freezing, in advance, a computing power token of the target computing task publisher that matches the target computing task; or when the target computing power node claims the target computing task, the smart contract freezing, in advance, a computing power token of the target computing power node that is claimed for payment of a timeout penalty of the target computing task.

In an exemplary embodiment, the method further includes: the smart contract determining that the target computing power node claims the target computing task, and then locking identification information of the target com-puting power node and the target computing task. The target computing power node during locking is not allowed to claim other computing tasks.

In an exemplary embodiment, executing allocation of the computing power token corresponding to the verification result includes: when the verification result is used for indicating that the computing result is correct, paying, to the target computing power node, a computing power token that is claimed by a remuneration for completing the target computing task; and when the verification result is used for indicating that the computing result is incorrect, deducting the computing power token of the target computing power node that is claimed for payment of the timeout penalty of the target computing task.

In an exemplary embodiment, after the smart contract initiating the process of verifying the computing result, the method further includes: when not receiving the verification result, the smart contract paying, to the target computing power node, a computing power token corresponding to computing power that is consumed by the target computing power node to execute the target computing task from the computing power tokens of the target computing task pub-lisher; and when determining that the target computing task publisher does not receive the computing result, the smart contract deducting the computing power token of the target computing power node that is claimed for payment of the timeout penalty of the target computing task.

In an exemplary embodiment, before the smart contract receiving the computing result that is submitted by the target computing power node after execution of the target com-puting task is completed, the method further includes: receiving a smart contract calling application submitted by the target computing power node; the smart contract deter-mining, based on the smart contract calling application, a computing power evaluation task for evaluating computing power of the target computing power node; the smart contract sending the computing power evaluation task to the target computing power node to instruct the target comput-ing power node to execute the computing power evaluation task; and the smart contract receiving second signature information returned by the target computing power node, and returning, to the target computing power node, third signature information that is obtained after adding a time stamp and a signature to the second signature information, so as to instruct the target computing power node to generate a computing power registration transaction based on the third signature information and to publish same into the distributed ledger network. The second signature informa-tion is information that is obtained by signing an execution result after the target computing power node completes execution of the computing power evaluation task.

In an exemplary embodiment, the method further includes: receiving a computing power update smart con-tract calling application submitted by the target computing power node; the smart contract determining, based on the computing power update smart contract calling application, an update computing power evaluation task for evaluating updated computing power of the target computing power node; the smart contract sending the update computing power evaluation task to the target computing power node to instruct the target computing power node to execute the update computing power evaluation task; and the smart contract receiving fourth signature information returned by the target computing power node, and returning, to the target computing power node, fifth signature information that is obtained after adding a time stamp and a signature to the fourth signature information, so as to instruct the target computing power node to generate a computing power update transaction based on the fifth signature information and to publish same into the distributed ledger network. The fourth signature information is information that is obtained by signing the execution result after the target computing power node completes execution of the update computing power evaluation task.

From the above descriptions about the implementation modes, those skilled in the art may clearly know that the method according to the foregoing embodiments may be implemented in a manner of combining software and a necessary universal hardware platform, and of course, may also be implemented through hardware, but the former is a preferred implementation mode under many circumstances. Based on such an understanding, the technical solutions of the present disclosure substantially or parts making contri-butions to the conventional art may be embodied in form of software product, and the computer software product is stored in a storage medium (e.g., a Read Only Memory (ROM)/Random Access Memory (RAM), a magnetic disk and an optical disk), including a plurality of instructions configured to enable a terminal device (which may be a mobile phone, a computer, a server, a network device, or the like) to execute the method in each embodiment of the present disclosure.

This embodiment further provides an apparatus for executing a computing task. The apparatus is configured to implement the foregoing embodiments and the preferred implementation, and what has been described will not be described again. As used below, the term "module" may be a combination of software and/or hardware that implements a predetermined function. Although the apparatus described in the following embodiments is preferably implemented in software, but implementations in hardware, or a combina-tion of software and hardware, are also possible and con-ceived.

Figure 11:
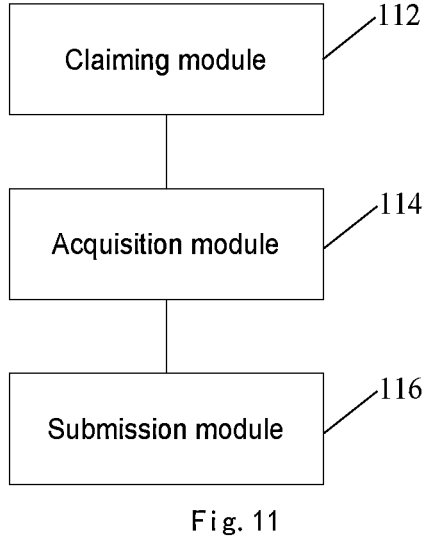
FIG. 11 is a structural block diagram I of an apparatus for executing a computing task according to embodiments of the present disclosure.

FIG. 11 is a structural block diagram I of an apparatus for executing a computing task according to embodiments of the present disclosure. The apparatus is applied to a target computing power node. As shown in FIG. 11, the apparatus includes a claiming module, an acquisition module, and a submission module.

The claiming module 112 is configured to claim a target computing task by querying a smart contract in a distributed ledger network. The target computing power node is a node which completes computing power registration in the distributed ledger network in advance, and the target computing task is published by a target computing task publisher in the distributed ledger network.

The acquisition module 114 is configured to execute the target computing task based on task information of the target computing task, so as to obtain a target computing result.

The submission module 116 is configured to submit the target computing result to the smart contract, so as to instruct the smart contract to initiate a process of verifying the target computing result and to execute allocation of a computing power token corresponding to a verification result.

In an exemplary embodiment, the apparatus is further configured to: submit the target computing result to the smart contract, and then acquire first signature information from the smart contract, where the first signature information is information that is generated after the target computing power node verifies and signs the target computing result; and sign the first signature information, then generating a target computing power transaction, and publishing same to the distributed ledger network.

In an exemplary embodiment, the apparatus is further configured to: generate the target computing power transaction, and publishes same to the distributed ledger network, and then receive a computing power token provided by the smart contract according to a target rule.

In an exemplary embodiment, the apparatus is further configured to: when publishing the target computing power transaction, reference a first transaction that is synchronized in the distributed ledger network by the target computing power node.

In an exemplary embodiment, the apparatus is further configured to implement, by the following manner, referencing the first transaction that is synchronized in the distributed ledger network by the target computing power node: referencing two other computing power transactions that are synchronized in the distributed ledger network by the target computing power node, and a latest computing power transaction that has been previously published by the target computing power node.

In an exemplary embodiment, the apparatus is further configured to: execute computing power registration in the distributed ledger network before the target computing power node claiming the target computing task by querying the smart contract in the distributed ledger network.

In an exemplary embodiment, the apparatus is further configured to implement, by the following manner, executing computing power registration in the distributed ledger network: sending a smart contract calling application to the smart contract based on a computing power capability of the target computing power node; receiving a computing power evaluation task returned by the smart contract based on the smart contract calling application; executing the computing power evaluation task, and signing an execution result after execution of the computing power evaluation task is completed, so as to obtain second signature information; sending the second signature information to the smart contract; and when receiving third signature information returned by the smart contract based on the second signature information, generating a computing power registration transaction based on the third signature information, and publishing same into the distributed ledger network, where the third signature information is information that is obtained after the smart contract adds a time stamp and a signature to the second signature information.

In an exemplary embodiment, when the computing power registration transaction completes agreement, the target computing power node is allowed to provide computing power to a computing power network; the computing power network includes the distributed ledger network; nominal computing power of the target computing power node is a ratio of a computing power reference time to a difference value between evaluation completion and issuance time stamps in a registration transaction, the evaluation completion is used for indicating that evaluation of a first node parameter local to the target computing power node is completed, and a correct execution result of the computing power evaluation task is able to be obtained through the first node parameter after the evaluation completion.

In an exemplary embodiment, the apparatus is further configured to: when publishing the computing power registration transaction, a second transaction that is synchronized in the distributed ledger network by the target computing power node.

In an exemplary embodiment, the apparatus is further configured to implement, by the following manner, referencing the second transaction that is synchronized in the distributed ledger network by the target computing power node: referencing one other computing power registration transaction and/or computing power update transaction that is allowed to be verified and synchronized in the distributed ledger network by the target computing power node, and one other computing power transaction that is allowed to be verified and synchronized in the distributed ledger network by the target computing power node.

In an exemplary embodiment, the apparatus is further configured to: update registered computing power in the distributed ledger network.

In an exemplary embodiment, the apparatus is further configured to implement, by the following manners, updating the registered computing power in the distributed ledger network: when determining that self-computing power capability has changed, sending a computing power update smart contract calling application to the smart contract; receiving an update computing power evaluation task returned by the smart contract based on the computing power update smart contract calling application; executing the update computing power evaluation task, and signing an execution result after execution of the update computing power evaluation task is completed, so as to obtain fourth signature information; sending the fourth signature information to the smart contract; and when receiving fifth signature information returned by the smart contract based on the fourth signature information, generating a computing power update transaction based on the fifth signature information, and publishing same into the distributed ledger network, where the fifth signature information is information that is obtained after the smart contract adds a time stamp and a signature to the fourth signature information.

In an exemplary embodiment, when the computing power update transaction completes agreement, the target computing power node is allowed to provide updated computing power to a computing power network; the computing power network includes the distributed ledger network; updated nominal computing power of the target computing power node is a ratio of a computing power reference time to a difference value between evaluation completion and issuance time stamps in an update transaction, the evaluation completion is used for indicating that evaluation of a second node parameter local to the target computing power node is completed, and a correct execution result of the update computing power evaluation task is able to be obtained through the second node parameter after the evaluation completion.

In an exemplary embodiment, the apparatus is further configured to: when publishing the computing power update transaction, reference a third transaction that is synchronized in the distributed ledger network by the target computing power node.

In an exemplary embodiment, referencing the third transaction that is synchronized in the distributed ledger network by the target computing power node includes: referencing one other computing power registration transaction and/or computing power update transaction that is allowed to be verified and synchronized in the distributed ledger network by the target computing power node, one other computing power transaction that is allowed to be verified and synchronized in the distributed ledger network by the target computing power node, and a latest transaction that is completed before the target computing power node updates the registered computing power.

Figure 12:
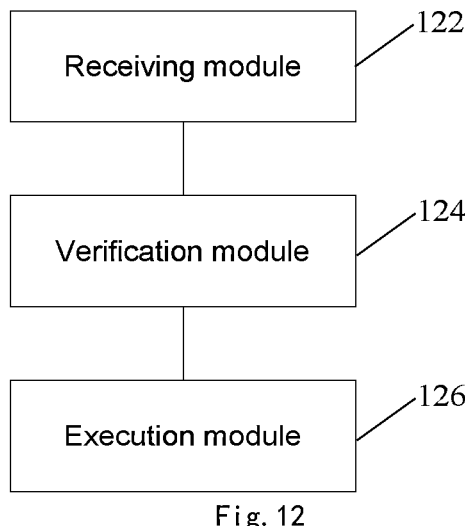
FIG. 12 is a structural block diagram II of an apparatus for executing a computing task according to embodiments of the present disclosure.

FIG. 12 is a structural block diagram II of an apparatus for executing a computing task according to embodiments of the present disclosure. The apparatus is applied to a smart contract in a distributed ledger network. As shown in FIG. 12, the apparatus includes a receiving module, a verification module, and an execution module.

The receiving module 122 is configured to receive a computing result that is submitted by a target computing power node after execution of a target computing task is completed. The target computing power node is a node which completes computing power registration in the distributed ledger network in advance, the target computing task is a task that is published by a target computing task publisher in the distributed ledger network by calling the smart contract, the target computing power node claims and executes the target computing task by querying the smart contract.

The verification module 124 is configured to initiate a process of verifying the computing result, so as to obtain a verification result.

The execution module 126 is configured to execute allocation of a computing power token corresponding to the verification result.

In an exemplary embodiment, the verification module 124 includes: a saving unit, configured to save the computing result in the form of privacy data; and an informing unit, configured to inform the task publisher to verify the computing result saved in the smart contract, so as to obtain the verification result.

In an exemplary embodiment, the informing unit is configured to: inform the task publisher to execute the following operation to verify the computing result: submitting, by the task publisher, a first smart contract for executing a verification operation, and operating the first smart contract in a smart contract operating environment in which the smart contract is located, so as to use the first smart contract to verify the computing result.

In an exemplary embodiment, before receiving the computing result that is submitted by the target computing power node after execution of the target computing task is completed, the apparatus is further configured to execute at least one of the following operations: when the target computing task publisher publishes the target computing task, freezing, in advance, a computing power token of the target computing task publisher that matches the target computing task; or when the target computing power node claims the target computing task, freezing, in advance, a computing power token of the target computing power node that is claimed for payment of a timeout penalty of the target computing task.

In an exemplary embodiment, the apparatus is further configured to: determine that the target computing power node claims the target computing task, and then lock identification information of the target computing power node and the target computing task. The target computing power node during locking is not allowed to claim other computing tasks.

In an exemplary embodiment, the execution module 126 includes: a payment unit, configured to when the verification result is used for indicating that the computing result is correct, pay, to the target computing power node, a computing power token that is claimed by a remuneration for completing the target computing task; and a deduction unit, configured to when the verification result is used for indicating that the computing result is incorrect, deduct the computing power token of the target computing power node that is claimed for payment of the timeout penalty of the target computing task.

In an exemplary embodiment, the apparatus is further configured to, after initiating the process of verifying the computing result, and when not receiving the verification result, pay, to the target computing power node, a computing power token corresponding to computing power that is consumed by the target computing power node to execute the target computing task from the computing power tokens of the target computing task publisher; and when determining that the target computing task publisher does not receive the computing result, deduct the computing power token of the target computing power node that is claimed for payment of the timeout penalty of the target computing task.

In an exemplary embodiment, before the smart contract receiving the computing result that is submitted by the target computing power node after execution of the target computing task is completed, the apparatus is further configured to: receive a smart contract calling application submitted by the target computing power node; determine, based on the smart contract calling application, a computing power evaluation task for evaluating computing power of the target computing power node; send the computing power evaluation task to the target computing power node to instruct the target computing power node to execute the computing power evaluation task; and receive second signature information returned by the target computing power node, and return, to the target computing power node, third signature information that is obtained after adding a time stamp and a signature to the second signature information, so as to instruct the target computing power node to generate a computing power registration transaction based on the third signature information and to publish same into the distributed ledger network. The second signature information is information that is obtained by signing an execution result after the target computing power node completes execution of the computing power evaluation task.

In an exemplary embodiment, the apparatus is further configured to: receive a computing power update smart contract calling application submitted by the target computing power node; determine, based on the computing power update smart contract calling application, an update computing power evaluation task for evaluating updated computing power of the target computing power node; send the update computing power evaluation task to the target computing power node to instruct the target computing power node to execute the update computing power evaluation task; and receive fourth signature information returned by the target computing power node, and return, to the target computing power node, fifth signature information that is obtained after adding a time stamp and a signature to the fourth signature information, so as to instruct the target computing power node to generate a computing power update transaction based on the fifth signature information and to publish same into the distributed ledger network. The fourth signature information is information that is obtained by signing the execution result after the target computing power node completes execution of the update computing power evaluation task.

It is to be noted that, each of the above modules may be implemented by software or hardware. For the latter, it may be implemented in the following manners, but is not limited to the follow: the above modules are all located in a same processor; or the above modules are located in different processors in any combination.

An embodiment of the present disclosure further provides a computer-readable storage medium. The computer-readable storage medium stores a computer program. Steps in any one of the above method embodiments are executed when the computer program is configured to operate.

In an exemplary embodiment, the computer-readable storage medium may include, but is not limited to, a USB flash disk, a Read-Only Memory (ROM), a Random Access Memory (RAM), and various media that can store computer programs, such as a mobile hard disk, a magnetic disk, or an optical disk.

An embodiment of the present disclosure further provides an electronic apparatus. The electronic apparatus includes a memory and a processor. The memory is configured to store a computer program. The processor is configured to operate the computer program to execute steps in any one of method embodiments described above.

In an exemplary embodiment, the electronic apparatus may further include a transmission device and an input/output device. The transmission device is connected to the processor. The input/output device is connected to the processor.

For specific examples in this embodiment, refer to the examples described in the foregoing embodiments and the exemplary implementations, and this embodiment will not be repeated thereto.

It is apparent that those skilled in the art should understand that the above mentioned modules or steps of the present disclosure may be implemented by a general computing device, and may also be gathered together on a single computing device or distributed in network composed of multiple computing devices. The above mentioned modules or steps of the present application may be implemented with program codes executable by the computing device, so that may be stored in a storage device for execution by the computing device, and in some cases, the steps shown or described may be performed in a different sequence than herein, or can be fabricated into individual integrated circuit modules respectively, or multiple modules or steps thereof are fabricated into a single integrated circuit module for implementation. In this way, the present disclosure is not limited to any specific combination of hardware and software.

The above are only the preferred embodiments of the present disclosure and are not intended to limit the present disclosure. For those skilled in the art, the present disclosure may have various modifications and variations. Any modifications, equivalent replacements, improvements and the like made within the principle of the present disclosure all fall within the scope of protection of the present disclosure.

What is claimed is:

1. A method for executing a computing task, comprising:
a target computing power node claiming a target computing task by querying a smart contract in a distributed ledger network, wherein the target computing power node is a node which completes computing power registration in the distributed ledger network in advance, and the target computing task is published by a target computing task publisher in the distributed ledger network;
the target computing power node executing the target computing task based on task information of the target computing task, so as to obtain a target computing result; and
the target computing power node submitting the target computing result to the smart contract, so as to instruct the smart contract to initiate a process of verifying the target computing result and to execute allocation of a computing power token corresponding to a verification result.

2. The method according to claim 1, wherein after the target computing power node submitting the target computing result to the smart contract, the method further comprises:
the target computing power node acquiring first signature information from the smart contract, wherein the first signature information is information that is generated after the target computing power node verifies and signs the target computing result; and
the target computing power node signing the first signature information, then generating a target computing power transaction, and publishing the target computing power transaction to the distributed ledger network.

3. The method according to claim 2, wherein after the target computing power node generating the target computing power transaction, and publishing the target computing power transaction to the distributed ledger network, the method further comprises:
the target computing power node receiving the computing power token provided by the smart contract according to a target rule.

4. The method according to claim 2, further comprising:
when publishing the target computing power transaction, the target computing power node referencing a first transaction that is synchronized in the distributed ledger network by the target computing power node.

5. The method according to claim 1, wherein before the target computing power node claiming the target computing task by querying the smart contract in the distributed ledger network, the method further comprises:
the target computing power node executing computing power registration in the distributed ledger network.

6. The method according to claim 5, wherein, when the computing power registration transaction completes agreement, the target computing power node is allowed to provide computing power to a computing power network; the computing power network comprises the distributed ledger network; nominal computing power of the target computing power node is a ratio of a computing power reference time to a difference value between evaluation completion and issuance time stamps in a registration transaction, the evaluation completion is used for indicating that evaluation of a first node parameter local to the target computing power node is completed, and a correct execution result of the computing power evaluation task is able to be obtained through the first node parameter after the evaluation completion.

7. The method according to claim 6, further comprising:
when publishing the computing power registration transaction, the target computing power node referencing a second transaction that is synchronized in the distributed ledger network by the target computing power node.

8. The method according to claim 7, further comprising:
the target computing power node updating registered computing power in the distributed ledger network.

9. The method according to claim 8, wherein, when the computing power update transaction completes agreement, the target computing power node is allowed to provide updated computing power to a computing power network; the computing power network comprises the distributed ledger network; updated nominal computing power of the target computing power node is a ratio of a computing power reference time to a difference value between evaluation completion and issuance time stamps in an update transaction, the evaluation completion is used for indicating that evaluation of a second node parameter local to the target computing power node is completed, and a correct execution result of the update computing power evaluation task is able to be obtained through the second node parameter after the evaluation completion.

10. The method according to claim 8, further comprising:
when publishing the computing power update transaction, the target computing power node referencing a third transaction that is synchronized in the distributed ledger network by the target computing power node.

11. A non-transitory computer-readable storage medium, a computer program is stored therein, wherein, the computer program is configured to, when executed by a processor, implement steps of the method as claimed in claim 1.

12. An electronic apparatus, comprising a memory, a processor, and a computer program that is stored in the memory and executable on the processor, wherein the processor is configured to execute the computer program to implement steps of the method as claimed in claim 1.

13. A method for executing a computing task, comprising:
a smart contract in a distributed ledger network receiving a computing result that is submitted by a target computing power node after execution of a target computing task is completed, wherein the target computing power node is a node which completes computing power registration in the distributed ledger network in advance, the target computing task is a task that is published by a target computing task publisher in the distributed ledger network by calling the smart contract, the target computing power node claims and executes the target computing task by querying the smart contract;
the smart contract initiating a process of verifying the computing result, so as to obtain a verification result; and
the smart contract executing allocation of a computing power token corresponding to the verification result.

14. The method according to claim 13, wherein the smart contract initiating the process of verifying the computing result, so as to obtain the verification result comprises:
the smart contract saving the computing result in the form of privacy data; and
the smart contract informing the task publisher to verify the computing result saved in the smart contract, so as to obtain the verification result.

15. The method according to claim 14, wherein the smart contract informing the task publisher to verify the computing result saved in the smart contract comprises:
the smart contract informing the task publisher to execute the following operation to verify the computing result:
submitting, by the task publisher, a first smart contract for executing a verification operation, and operating the first smart contract in a smart contract operating environment in which the smart contract is located, so as to use the first smart contract to verify the computing result.

16. The method according to claim 13, wherein before the smart contract receiving the computing result that is submitted by the target computing power node after execution of the target computing task is completed, the method further comprises at least one of the following:
when the target computing task publisher publishes the target computing task, the smart contract freezing, in advance, a computing power token of the target computing task publisher that matches the target computing task; or
when the target computing power node claims the target computing task, the smart contract freezing, in advance, a computing power token of the target computing power node that is claimed for payment of a timeout penalty of the target computing task.

17. The method according to claim 13, further comprising:
the smart contract determining that the target computing power node claims the target computing task, and then locking identification information of the target computing power node and the target computing task, wherein the target computing power node during locking is not allowed to claim other computing tasks;
or, wherein the smart contract executing allocation of the computing power token corresponding to the verification result comprises:
when the verification result is used for indicating that the computing result is correct, the smart contract paying, to the target computing power node, a computing power token that is claimed by a remuneration for completing the target computing task; and
when the verification result is used for indicating that the computing result is incorrect, the smart contract deducting the computing power token of the target computing power node that is claimed for payment of the timeout penalty of the target computing task;
or, wherein after the smart contract initiating the process of verifying the computing result, the method further comprises:
when not receiving the verification result, the smart contract paying, to the target computing power node, a computing power token corresponding to computing power that is consumed by the target computing power node to execute the target computing task from the computing power tokens of the target computing task publisher; and
when determining that the target computing task publisher does not receive the computing result, the smart contract deducting the computing power token of the target computing power node that is claimed for payment of the timeout penalty of the target computing task.

18. An apparatus for executing a computing task, applied to a target computing power node and comprising:
a claiming module, configured to claim a target computing task by querying a smart contract in a distributed ledger network, wherein the target computing power node is a node which completes computing power registration in the distributed ledger network in advance, and the target computing task is published by a target computing task publisher in the distributed ledger network; 5 an acquisition module, configured to execute the target computing task based on task information of the target computing task, so as to obtain a target computing result; and a submission module, configured to submit the target 10 computing result to the smart contract, so as to instruct the smart contract to initiate a process of verifying the target computing result and to execute allocation of a computing power token corresponding to a verification result. 15

\* \* \* \* \*